United States Patent
Ditzler

(10) Patent No.: US 6,372,096 B1
(45) Date of Patent: Apr. 16, 2002

(54) PRESSURE REGULATION PROCESS FOR OZONE GENERATING CELL

(75) Inventor: Lee C. Ditzler, Diablo, CA (US)

(73) Assignee: Novazone, Livermore, CA (US)

( * ) Notice: Subject to any disclaimer, the term of this patent is extended or adjusted under 35 U.S.C. 154(b) by 0 days.

(21) Appl. No.: 09/579,339

(22) Filed: May 25, 2000

(51) Int. Cl.[7] .............................. H05F 3/00; B01J 19/08
(52) U.S. Cl. .................................. 204/164; 422/186.07
(58) Field of Search ....................... 422/186.07; 204/164

(56) References Cited

U.S. PATENT DOCUMENTS

| | | | | |
|---|---|---|---|---|
| 5,326,539 A | * | 7/1994 | Taylor | 422/186.3 |
| 5,393,417 A | * | 2/1995 | Cox | 210/96.1 |
| 5,794,114 A | * | 8/1998 | Harada et al. | 422/186.1 |
| 6,007,785 A | * | 12/1999 | Liou | 422/186.07 |
| 6,129,850 A | * | 10/2000 | Martin et al. | 210/760 |

* cited by examiner

Primary Examiner—Kathryn Gorgos
Assistant Examiner—Thao Tran

(74) Attorney, Agent, or Firm—Townsend and Townsend and Crew LLP

(57) ABSTRACT

A system for generating ozone by corona discharge comprises a corona discharge ozone generating cell. A downstream pressure regulator is disposed downstream and coupled to the corona discharge ozone generating cell for setting and automatically maintaining a desired cell pressure for the ozone generating cell so that effects of variances caused by processing of the ozone-containing gas downstream of the ozone generating cell on ozone production by the ozone generating cell are eliminated or at least minimized. A flow control orifice is provided upstream of the ozone generating cell for controlling the flow of incoming gas to the ozone generating cell for producing the ozone-containing gas. An upstream pressure regulator is provided upstream of the ozone generating cell for maintaining an inlet pressure of the incoming gas entering the ozone generating cell. After setting the desired cell pressure in the downstream pressure regulator, the desired flow control through the flow control orifice, and a voltage level for operating the ozone generating cell, the upstream pressure regulator can be adjusted to the optimum level to maximize ozone production.

20 Claims, 2 Drawing Sheets

PRESSURE REGULATION PROCESS FOR OZONE GENERATING CELL

BACKGROUND OF THE INVENTION

This invention relates generally to ozone generation and, more particularly, to improved systems and methods for generating ozone employing a corona discharge ozone generating cell.

Generation of ozone from an oxygen-containing gas is known. Ozone generation by corona discharge is affected by various factors. To maximize ozone production by a corona discharge ozone generating cell, the cell pressure and the flow of the oxygen-containing gas through the cell must be maintained within close tolerances. Typically these parameters have been controlled by adjusting valves and pressure regulators on inputs and outputs to the ozone generating cell. Once the control parameters are set and the process remains steady or constant, the ozone generating cell will operate within the prescribed parameters.

In a typical application involving ozone generation, however, the process does not remain constant. Continuous manual adjustments are often required to optimize ozone production in those situations. Examples of such dynamic processes include bubbling ozone into the bottom of a tank of water which varies in depth (back pressure variations), and moving an ozone output from a venturi with a negative pressure to an application requiring a positive pressure. These process variations will often adversely affect ozone production by the corona discharge ozone generating cell.

There is a need for minimizing the effect of process variations to ensure optimal ozone production by the corona discharge ozone generating cell in applications involving dynamic processes.

SUMMARY OF THE INVENTION

The present invention provides systems and methods for minimizing the effect of variations in processes occurring downstream of the corona discharge ozone generating cell on ozone production by the ozone generating cell. Specific embodiments of the invention minimize the effect of the downstream process variations on the corona discharge ozone generating cell pressure and flow. The invention does so by providing a relieving pressure regulator downstream of the corona discharge ozone generating cell and setting the regulator to the desired ozone generating cell pressure to eliminate or at least minimize the effect of downstream process variations. The relieving pressure regulator automatically maintains the pressure at the desired ozone generating cell pressure regardless of process variations occurring downstream of the ozone generating cell and relieving pressure regulator. A flow regulating orifice is provided upstream of the corona discharge ozone generating cell to control the flow of oxygen-containing gas into the ozone generating cell. Having set the desired ozone generating cell pressure and selecting the flow regulating orifice to control the flow of the incoming gas, the pressure of the incoming gas is adjusted upstream of the corona discharge ozone generating cell to achieve optimal ozone production by the ozone generating cell.

In accordance with one embodiment of the present invention, a system for generating ozone by corona discharge comprises a corona discharge ozone generating cell. A flow control orifice is disposed upstream of and coupled to the corona discharge ozone generating cell for controlling a flow of incoming gas to the corona discharge ozone generating cell for producing an ozone-containing gas from the incoming gas by corona discharge. An upstream pressure regulator is disposed upstream of and coupled to the corona discharge ozone generating cell for setting and automatically maintaining a desired inlet pressure of the incoming gas entering the corona discharge ozone generating cell. A downstream pressure regulator is disposed downstream of and coupled to the corona discharge ozone generating cell for setting and automatically maintaining a desired cell pressure for the corona discharge ozone generating cell so that effects of variances caused by processing of the ozone-containing gas downstream of the corona discharge ozone generating cell and the downstream pressure regulator on ozone production by the ozone generating cell are at least substantially eliminated.

In accordance with another embodiment of this invention, a system for generating ozone by corona discharge comprises a corona discharge ozone generating cell, and means for controlling a flow of oxygen-containing gas to the corona discharge ozone generating cell for generating ozone from the oxygen-containing gas by corona discharge. The system further comprises means disposed downstream of and coupled to the corona discharge ozone generating cell for automatically maintaining a desired preset cell pressure for the corona discharge ozone generating cell to minimize effects on process variations occurring downstream of the corona discharge ozone generating cell. The system also comprises means disposed upstream of and coupled to the corona discharge ozone generating cell for selecting and automatically maintaining a pressure of the oxygen-containing gas flowing into the corona discharge ozone generating cell to maximize ozone production.

In accordance with another embodiment of the invention, a method for controlling ozone production of a corona discharge ozone generating cell comprises the step of controlling a flow of incoming gas to the corona discharge ozone generating cell for producing an ozone-containing gas by corona discharge and providing a measurement representing a flow rate of the flow of incoming gas to the corona discharge ozone generating cell. A pressure of the ozone-containing gas exiting downstream of the corona discharge ozone generating cell is set and automatically maintained to minimize effects of variances caused by processing of the ozone-containing gas downstream of the corona discharge ozone generating cell. The method further comprises the step of adjusting and automatically maintaining a pressure of the incoming gas in response to the set pressure for the ozone-containing gas exiting downstream of the corona discharge ozone generating cell and the measurement representing the flow rate of the flow of incoming gas to the corona discharge generating cell to maximize ozone production by the corona discharge ozone generating cell.

DESCRIPTION OF THE SPECIFIC EMBODIMENTS

Figure 1:
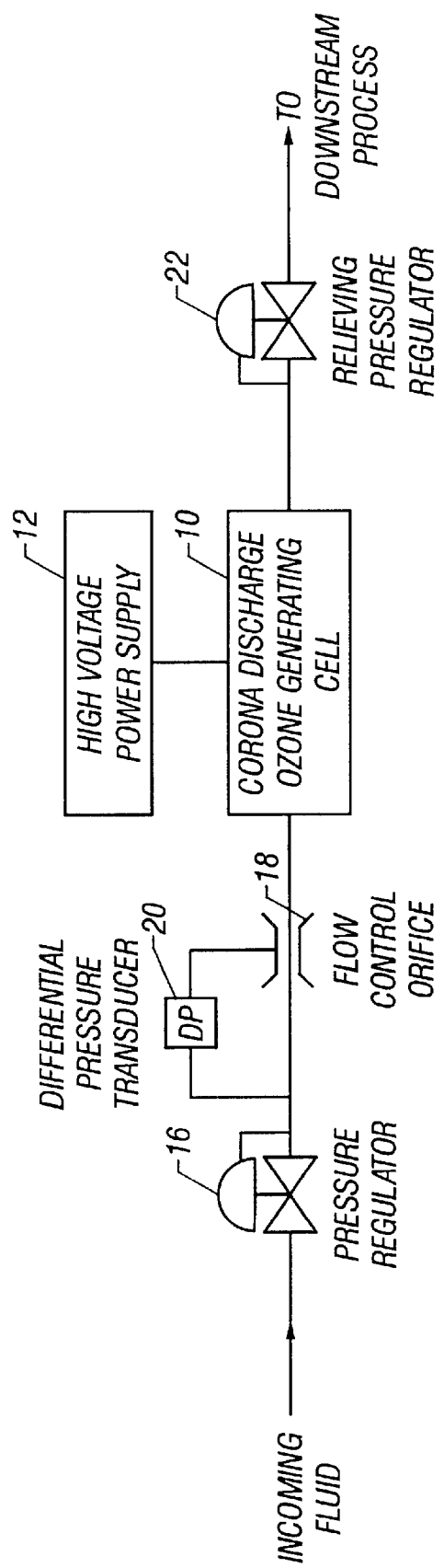
FIG. 1 is a block diagram of a corona discharge ozone generating system in accordance with an embodiment of the present invention.

In the embodiment shown in FIG. 1, a corona discharge ozone generating cell 10 typically operates with a high voltage power supply 12. The corona discharge ozone generating cell 10 receives at the inlet an incoming gas which includes oxygen (e.g., air) and produces an ozone-containing gas flowing downstream from the outlet thereof.

Disposed upstream of the ozone generating cell 10 is an upstream pressure regulator 16 which maintains the inlet pressure of the incoming gas to the ozone generating cell 10 over varying flow conditions. Also disposed upstream of the ozone generating cell 10 is a flow regulating orifice 18 which controls the flow of the incoming gas into the ozone generating cell 10. The flow control orifice 18 is typically fixed, but may be adjustable, such as a valve. In the embodiment shown, a differential pressure transducer 20 is desirably provided across the flow regulating orifice 18 to provide an electrical signal representing the flow rate of the incoming gas entering the corona discharge ozone generating cell 10.

A relieving pressure regulator 22 is coupled downstream of the corona discharge ozone generating cell 10. Once the pressure level is selected, the relieving pressure regulator 22 automatically maintains the cell pressure of the ozone generating cell 10 at the desired preset level. By automatically maintaining the pressure level at the desired preset level, the downstream pressure regulator 22 eliminates or at least minimizes the effect of process variations from processes (not shown) occurring downstream of the corona discharge ozone generating cell 10 and the regulator 22. The relieving pressure regulator 22 includes components that are exposed to the ozone in the ozone-containing gas passing therethrough. Those components are desirably made of one or more materials that are compatible with ozone, such as PTFE or Teflon™, PVDF, or stainless steel. Most other types of plastic or rubber materials are not suitable for operating in an ozone environment. A variety of pressure regulators can be used, including mechanical regulators such as mechanical diaphragm regulators and electronically driven regulators. Electronically driven regulators are more accurate, but are also more costly.

Typically, the upstream pressure regulator 16 has a range of about 0–100 psi, and the gas flow across the flow regulating orifice 18 into the corona discharge ozone generating cell 10 ranges from about 0.01 to 100 scfm. The differential pressure as measured by the differential pressure transducer 20 has a typical range of about 0–50 psi. The relieving pressure regulator 22 has a typical range of about 0–50 psi. If a mechanical diaphragm regulator is used for the downstream pressure regulator 22, the ratio of the diaphragm to the outlet typically operates at a ratio ranging from about 5:1 to 200:1. In a specific embodiment, the upstream pressure regulator 16 operates at about 12–20 psi, the flow through the ozone generating cell 10 is about 0.5 to 1 scfm, and the differential pressure across the flow control orifice 18 as measured by the transducer 20 ranges between about 0.1 and 10 psi. The downstream pressure regulator 22 is a mechanical diaphragm regulator operating at a ratio of about 30:1 and a pressure setting of about 10–15 psi.

Referring to FIG. 1, the method of minimizing the effect of downstream process variations on the performance of the corona discharge ozone generating cell 10 is described as follows. The voltage level of the high voltage power supply 12 is selected for operating the corona discharge ozone generating cell 10 to produce an ozone-containing gas from an incoming gas. The desired flow control of the incoming gas to the corona discharge ozone generating cell 10 is obtained by selecting an appropriate flow control orifice 18 or, if the orifice 18 is adjustable, by adjusting the flow control orifice 18 to a particular size. The downstream relieving pressure regulator 22 is set to the desired ozone generating cell pressure for the corona discharge ozone generating cell 10. The relieving pressure regulator 22 eliminates or at least minimizes the effect of downstream process variations by automatically maintaining the cell pressure of the corona discharge ozone generating cell 10 at the desired preset level. Having set the upstream pressure regulator 16 to produce the desired flow at the orifice 18, and the desired cell pressure at the regulator 22, the ozone production is controlled by varying the power supply voltage and frequency of the power supply 12, maximizing ozone production of the ozone generating cell 10.

For a given corona discharge ozone generating cell 10, a series of tests can be conducted to ascertain the combination of parameters to achieve maximum ozone production. For instance, after determining the optimal pressure for the upstream pressure regulator 16 to achieve maximum ozone production for a set of voltage, flow rate, and cell pressure levels, the values for these parameters are recorded. The procedure of obtaining the optimal pressure for the upstream pressure regulator 16 is then repeated by independently varying the voltage of the power supply 12, the flow control by the orifice 18 as represented by the reading of the differential pressure transducer 20, and the cell pressure at the relieving pressure regulator 22. Once these parameter values for maximum ozone production using the particular corona discharge ozone generating cell 10 are known from carrying out the iterative procedure, proper adjustments can be easily made to the upstream pressure regulator 16 for selected voltage, flow control, and cell pressure levels to achieve maximum ozone production. Continuous manual adjustments are avoided.

The invention has now been described with reference to specific embodiments. Alternatives and substitutions will now be apparent to persons of skill in the art. For example, alternative mechanisms for controlling, measuring, and representing the flow of the incoming gas entering the ozone generating cell can be used instead of the flow control orifice 18 and differential pressure transducer 20. For instance, various flow meters and control mechanisms are available for controlling and measuring flow. The combination of the flow control orifice 18 and differential pressure transducer 20 is preferable, however, because of its simplicity, ease of use, and low cost.

Figure 2:
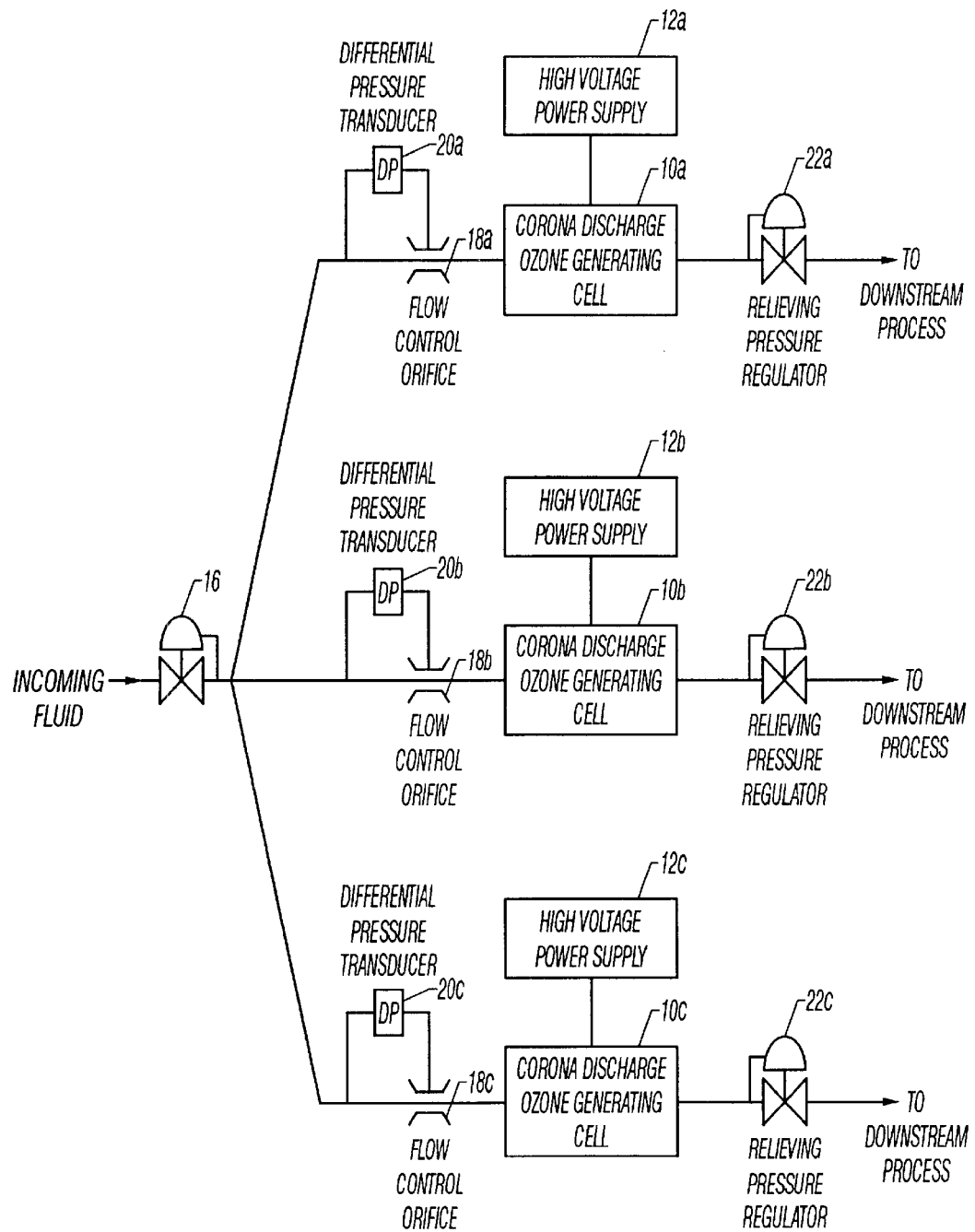
FIG. 2 is a block diagram of a corona discharge ozone generating system having multiple ozone generating cells in accordance with another embodiment of the present invention.

Moreover, a single upstream pressure regulator 16 can feed multiple flow regulating orifices (18a, 18b, 18c) with differential pressure transducers (20a, 20b, 20c) and multiple corona discharge ozone generating cells (10a, 10b, 10c) disposed respectively in a plurality of flow branches, as illustrated in FIG. 2. In each flow branch, a downstream pressure regulator (22a, 22b, 22c) is disposed downstream of and coupled to the corona discharge ozone generating cell (10a, 10b, 10c) in the flow branch to minimize the effects of downstream process variations. Although three flow branches are shown, fewer or more flow branches may be provided. The scope of the invention should, therefore, be determined not with reference to the above description, but should be determined with reference to the appended claims along with their full scope of equivalents.

What is claimed is:

1. A system for generating ozone by corona discharge, comprising:

a plurality of corona discharge ozone generating cells each disposed respectively in one of a plurality of flow branches;

a plurality of flow control orifices each disposed in one of the flow branches upstream of and coupled to the corona discharge ozone generating cell in the flow branch for controlling a flow of incoming gas to the corona discharge ozone generating cell for producing an ozone-containing gas in the flow branch from the incoming gas by corona discharge;

an upstream pressure regulator disposed upstream of and coupled to the plurality of corona discharge ozone generating cells in the flow branches in parallel for setting and automatically maintaining a desired inlet pressure of the incoming gas entering each corona discharge ozone generating cell; and a plurality of downstream pressure regulators each disposed in one of the flow branches downstream of and coupled to the corona discharge ozone generating cell in the flow branch for setting and automatically maintaining a separate, desired cell pressure for the corona discharge ozone generating cell in each flow branch so that effects of variances caused by processing of the ozone-containing gas downstream of the corona discharge ozone generating cell and the downstream pressure regulator on ozone production by the ozone generating cell in each flow branch are at least substantially eliminated.

2. The system of claim 1 wherein the upstream pressure regulator has a range of between about 0–100 psi.

3. The system of claim 1 wherein each flow control orifice has a fixed size.

4. The system of claim 1 wherein each flow control orifice has an adjustable size.

5. The system of claim 1 further comprising a plurality of differential pressure transducers each across the flow control orifice in one of the flow branches for providing an electrical signal representing the flow of incoming gas through the flow control orifice to the corona discharge ozone generating cell in the flow branch.

6. The system of claim 5 wherein each differential pressure transducer has a range of between about 0–50 psi.

7. The system of claim 1 wherein each corona discharge ozone generating cell has a flow range of between about 0.01 to 1000 scfm.

8. The system of claim 1 wherein the plurality of flow branches are separate to provide ozone-containing gases to separate downstream processes.

9. The system of claim 1 wherein each downstream pressure regulator includes components exposed to the ozone-containing gas, the components being made of one or more materials which are compatible with the ozone-containing gas.

10. The system of claim 9 wherein the materials are selected from the group consisting of PTFE, PVDF, and stainless steel.

11. The system of claim 1 wherein each downstream pressure regulator has a range of between about 0–50 psi.

12. A system for generating ozone by corona discharge, comprising:

a plurality of flow branches each having a corona discharge ozone generating cell disposed therein;

means, disposed in each of the plurality of flow branches, for controlling a flow of oxygen-containing gas to the corona discharge ozone generating cell for generating ozone from the oxygen-containing gas by corona discharge;

means disposed downstream of and coupled to the corona discharge ozone generating cell in each of the plurality of flow branches for automatically maintaining a desired preset cell pressure for the corona discharge ozone generating cell to minimize effects on process variations occurring downstream of the corona discharge ozone generating cell in the flow branch; and an upstream pressure regulator disposed upstream of and coupled to the corona discharge ozone generating cells in the flow branches in parallel for selecting and automatically maintaining a pressure of the oxygen-containing gas flowing into the corona discharge ozone generating cell in each flow branch to maximize ozone production.

13. The system of claim 12 wherein each flow branch includes means disposed downstream of and coupled to the corona discharge ozone generating cell in the branch for automatically maintaining a desired preset cell pressure of the corona discharge ozone generating cell to minimize effects on process variations occurring downstream of the corona discharge ozone generating cell in the flow branch.

14. A method for controlling ozone production of a plurality of corona discharge ozone generating cells, comprising the steps of:

controlling a flow of incoming gas from a single incoming gas source to the corona discharge ozone generating cells each disposed in one of a plurality of flow branches for producing an ozone-containing gas by corona discharge and providing a measurement representing a flow rate of the flow of incoming gas to the corona discharge ozone generating cell in each flow branch;

setting and automatically maintaining a pressure of the ozone-containing gas exiting downstream of the corona discharge ozone generating cell in each flow branch to minimize effects of variances caused by processing of the ozone-containing gas downstream of the corona discharge ozone generating cell in each flow branch; and adjusting and automatically maintaining a pressure of the incoming gas in response to the set pressure for the ozone-containing gas exiting downstream of the corona discharge ozone generating cell in each flow branch and the measurement representing the flow rate of the flow of incoming gas to the corona discharge generating cell in each flow branch to maximize ozone production by the corona discharge ozone generating cell in each flow branch.

15. The method of claim 14 wherein the step of controlling the flow of incoming gas comprises providing a flow regulating orifice in each of the flow branches upstream of the corona discharge ozone generating cell in the flow branch to regulate the flow of incoming gas to the corona discharge ozone generating cell in the flow branch; and measuring a differential pressure across the flow regulating orifice representing the flow rate of the flow of incoming gas through the flow control orifice in each flow branch.

16. The method of claim 14 wherein the step of controlling the flow of incoming gas to the corona discharge ozone generating cells comprises setting the flow rate of the flow of incoming gas to between about 0.5–1 scfm.

17. The method of claim 14 wherein the step of setting and automatically maintaining the pressure of the ozone-containing gas exiting downstream of the corona discharge ozone generating cell in each flow branch comprises setting the pressure to between about 10–15 psi.

18. The method of claim 14 wherein the step of adjusting and automatically maintaining the pressure of the incoming gas comprises adjusting the pressure within a range of between about 12–20 psi.

19. The method of claim 14 wherein the step of setting and automatically maintaining the pressure of the ozone-containing gas exiting downstream of the corona discharge ozone generating cell in each flow branch comprises mechanically setting and automatically maintaining the pressure in each flow branch.

20. The method of claim 14 further comprising the step of setting a power level for the corona discharge ozone generating cell in each flow branch.

* * * * *